United States Patent
Landais et al.

(10) Patent No.: US 9,733,376 B2
(45) Date of Patent: Aug. 15, 2017

(54) COMBINED WIDE AND NARROW AZIMUTH SEISMIC DATA ACQUISITION SYSTEM AND METHOD

(71) Applicant: CGG SERVICES SA, Massy (FR)

(72) Inventors: Mickael Landais, Versailles (FR); Chu-Ong Ting, Fulshear, TX (US); Thomas Mensch, Paris (FR); Damien Grenie, Limours (FR)

(73) Assignee: CGG SERVICES SAS, Massy (FR)

( * ) Notice: Subject to any disclaimer, the term of this patent is extended or adjusted under 35 U.S.C. 154(b) by 391 days.

(21) Appl. No.: 14/190,837

(22) Filed: Feb. 26, 2014

(65) Prior Publication Data

US 2014/0241118 A1 Aug. 28, 2014

Related U.S. Application Data

(60) Provisional application No. 61/770,044, filed on Feb. 27, 2013, provisional application No. 61/810,319, filed on Apr. 10, 2013.

(51) Int. Cl.
 *G01V 1/38* (2006.01)
(52) U.S. Cl.
 CPC ...... *G01V 1/3808* (2013.01); *G01V 2210/165* (2013.01)
(58) Field of Classification Search
 CPC .... G01V 1/38; G01V 1/3843; G01V 2210/16; G01V 2210/165
 USPC ......................................................... 367/15
 See application file for complete search history.

(56) References Cited

U.S. PATENT DOCUMENTS

| | | | |
|---|---|---|---|
| 6,285,956 B1 * | 9/2001 | Bennett ................ | G01V 1/3808 367/16 |
| 7,679,990 B2 * | 3/2010 | Herkenhoff ............ | G01V 1/003 181/118 |
| 2003/0067842 A1 * | 4/2003 | Sukup .................. | G01V 1/3808 367/20 |
| 2007/0115757 A1 * | 5/2007 | Soerli ...................... | G01V 1/02 367/144 |
| 2007/0159921 A1 * | 7/2007 | Regone ................ | G01V 1/3808 367/15 |
| 2007/0165486 A1 | 7/2007 | Moldoveanu et al. | |
| 2011/0158044 A1 | 6/2011 | Moldoveanu et al. | |
| 2011/0199857 A1 | 8/2011 | Garden | |
| 2012/0069702 A1 * | 3/2012 | Muyzert .............. | G01V 1/3808 367/15 |
| 2012/0224453 A1 | 9/2012 | Wu | |

(Continued)

OTHER PUBLICATIONS

Cordsen et al., "Narrow versus wide azimuth land 3D seismic surveys", The Leading Edge, Aug. 2002, pp. 764-770.*

(Continued)

*Primary Examiner* — Ian J Lobo
(74) *Attorney, Agent, or Firm* — Patent Portfolio Builders PLLC

(57) ABSTRACT

There is a method for acquiring seismic data over a survey area. The method includes deploying streamer and source vessels to acquire seismic data along a survey line; performing one pass with the streamer and source vessels along the survey line for collecting wide azimuth (WAZ) data; and performing another pass with the streamer and source vessels along the survey line for collecting narrow azimuth (NAZ) data.

20 Claims, 17 Drawing Sheets

(56) References Cited

U.S. PATENT DOCUMENTS

2012/0320711 A1    12/2012  Hite
2013/0135966 A1*   5/2013  Rommel .............. G01V 1/3808
                                                              367/24

OTHER PUBLICATIONS

C. Mason et al., "Use of Narrow Azimuth Data for Enhanced Wavefield Extrapolation Multiple Prediction on a WAZ Survey", SEG 79th International Exposition and Annual Meeting, Houston, Oct. 25-29, 2009, pp. 3118-3122.
International Search Report dated Oct. 9, 2014, in related International Application No. PCT/EP2014/053876.
Written Opinion dated Oct. 9, 2014, in related International Application No. PCT/EP2014/053876.
L. Amundsen et al., "Seismic Imaging Technology—Part II: Lessons from Wide Azimuth Subsalt Imaging in Deepwater Gulf of Mexico", GEO ExPro (magazine), Recent Advances in Technology, May 2008, pp. 60-62.
M. Buia et al., "Shooting Seismic Surveys in Circles", Oilfield Review (magazine), Autumn 2008, pp. 18-31.
Written Opinion in corresponding Singapore Application No. 11201506483S dated May 10, 2016. (All references were previously submitted with Information Disclosure Statement on Oct. 22, 2014.)
Examination Report in corresponding Australian Application No. 2014222648 dated May 23, 2017. (All references previously made of record in an Information Disclosure Statement submitted on Oct. 22, 2014.)

* cited by examiner

COMBINED WIDE AND NARROW AZIMUTH SEISMIC DATA ACQUISITION SYSTEM AND METHOD

RELATED APPLICATION

The present application is related to, and claims priority from, U.S. Provisional Patent Application No. 61/770,044, filed Feb. 27, 2013, entitled "WAZ BROADSEIS," to Mickael LANDAIS, the disclosure of which is incorporated herein by reference, and from U.S. Provisional Patent Application No. 61/810,319, filed Apr. 10, 2013, entitled "B-WATS NEW DESIGN MARINE ACQUISITION," to Mickael LANDAIS, Chu-Ong TING, Thomas MENSCH and Damien GRENIE, the disclosure of which is incorporated herein by reference.

TECHNICAL FIELD

Embodiments of the subject matter disclosed herein generally relate to methods and systems for seismic data acquisition and, more particularly, to configuring seismic data acquisition systems for seismic data collection.

BACKGROUND

Seismic data acquisition and processing techniques are used to generate a profile (image) of a geophysical structure (subsurface) of the strata underlying a land surface or seafloor. Among other things, seismic data acquisition involves generating acoustic waves and collecting reflected/refracted versions of those acoustic waves to generate an image. This image does not necessarily provide an accurate location for oil and gas reservoirs, but it may suggest, to those trained in the field, the presence or absence of oil and/or gas reservoirs. Thus, providing an improved image of the subsurface in a shorter period of time is an ongoing process in the field of seismic surveying.

Mapping subsurface geology during exploration for oil, gas, and other minerals and fluids uses a form of remote sensing to construct two-dimensional or three-dimensional subsurface images. The process is known as seismic surveying, wherein an energy source transmits pressure pulses into the earth. These pressure pulses can be reflected by geological interfaces associated with the earth and subsequently recorded at the surface by arrays of detectors (receivers).

In order to provide some context for the process of seismic acquisition, consider a seismic data acquisition process and system as will now be described with respect to FIG. 1, in which a vessel 110 tows plural detectors 112, which are disposed along a cable 114. Cable 114 together with its corresponding detectors 112 are sometimes referred to, by those skilled in the art, as a streamer 116. Vessel 110 may tow plural streamers 116 at the same time. The streamers may be disposed horizontally, i.e., lie at a constant depth $z_1$ relative to the ocean surface 118. Also, plural streamers 116 may form a constant angle (i.e., the streamers may be slanted) with respect to the ocean surface.

Still with reference to FIG. 1, vessel 110 may also tow a seismic source array 120 configured to generate an acoustic wave 122a. The acoustic wave 122a propagates downward and penetrates the seafloor 124, eventually being reflected by a reflecting structure 126 (reflector R). The reflected acoustic wave 122b propagates upward and is detected by detector 112. For simplicity, FIG. 1 shows only two paths 122a corresponding to the acoustic wave. Parts of reflected acoustic wave 122b (primary) are recorded by the various detectors 112 (recorded signals are called traces), while parts of reflected wave 122c pass detectors 112 and arrive at the water surface 118. Since the interface between the water and air is well approximated as a quasi-perfect reflector (i.e., the water surface acts as a mirror for the acoustic waves), reflected wave 122c is reflected back toward detector 112 as shown by wave 122d in FIG. 1. Wave 122d is normally referred to as a ghost wave because it is due to a spurious reflection. The ghosts are also recorded by detector 112, but with reverse polarity and a time lag relative to primary wave 122b. Recorded traces may be used to determine the subsurface (i.e., earth structure below surface 124) and the position and presence of reflectors 126.

While FIG. 1 shows a streamer having a flat shape, it is possible to have a streamer with a variable-depth configuration as illustrated in FIG. 2. The variable-depth profile may have any shape. One example of a variable-depth profile is defined by three parametric quantities, $z_0$, $s_0$ and $h_c$. Note that not the entire streamer has to have the curved profile. The first parameter $z_0$ indicates the depth of the first detector 254a relative to the water surface 258. The second parameter $s_0$ is related to the slope of the initial part 252a of the streamer 252 relative to a horizontal line 264. The FIG. 2 example has initial slope $s_0$ equal to substantially 3 percent. Other values may be used. Note that the streamer 252 profile in FIG. 2 is not drawn to scale because a 3 percent slope is relatively slight. The third parameter $h_c$ indicates a horizontal length (distance along the X axis in FIG. 2 measured from the first detector 154a) of the curved portion of the streamer. This parameter may be in the range of hundreds to thousands of meters.

The traditional acquisition system 300 illustrated in FIG. 3 (which corresponds to the system shown in FIG. 1) tows both the source array 320 and the streamer spread 330 (which may include streamers 316 and/or source arrays 320) along a same survey line 340. Thus, azimuth diversity (where the azimuth is defined as the angle α made at a receiver 312 between the streamer direction (along the inline direction X), and an imaginary line 332 connecting source array 320 with receiver 312) is very narrow for this traditional configuration. To improve azimuth diversity, more modern seismic surveys use an additional vessel 350 that tows only source arrays 352 along a source line 360, which is parallel but offset in a cross-line direction Y from survey line 340. In this way, azimuth angle α' and data quality are increased. Note that for traditional seismic surveys, vessel 310 passes survey line 340 a single time.

As vessel 310 passes over the subsurface of interest, the source array generates pulses on a predefined schedule, and the streamer's receivers record the corresponding pressure waves and/or particle motion data. How the source arrays and receivers are positioned during the seismic acquisition campaign strongly influences collected seismic data quality, and also the time necessary to survey the desired subsurface. Experience has shown that the traditional seismic configurations illustrated in FIGS. 1 and 3 are not optimal. For example, not having the source arrays and/or receivers positioned according to a best scheme may increase the survey's overall duration, which negatively affects the time available for source array maintenance, increases exposure of survey personnel to health, safety and environmental (HSE) hazards, and induces higher survey costs.

Accordingly, it would be desirable to provide systems and methods that avoid the afore-described problems and drawbacks associated with wide-azimuth seismic data collection and provide a source array/receiver configuration, a source firing schedule or a tow vessel path configuration that improves target illumination, records near offset data with fewer passes and/or less time, provides a greater fraction of time for source array maintenance and shooting plan flexibility, while also minimizing interference and background noise collected with the seismic data.

SUMMARY

According to an embodiment, there is a method for acquiring seismic data over a survey area during a seismic survey. The method includes deploying streamer and source vessels to acquire seismic data along a survey line; performing one pass with the streamer and source vessels along the survey line for collecting WAZ data; and performing another pass with the streamer and source vessels along the survey line for collecting NAZ data.

According to another embodiment, there is a method for acquiring seismic data that includes deploying streamer and source vessels to acquire seismic data along a survey line; performing one pass with the streamer and source vessels along the survey line for collecting WAZ data; and performing another pass, during the same seismic survey, with the streamer and source vessels along the survey line for simultaneously collecting NAZ data and WAZ data.

According to yet another embodiment, there is a marine seismic acquisition system for collecting seismic data. The system includes a streamer vessel configured to tow a streamer spread along a survey line; at least one source vessel configured to tow a source along a first source line, substantially parallel to the survey line, for generating WAZ data; and a controller configured to direct, in one pass, the streamer vessel along the survey line and the source vessel along the first source line for collecting the WAZ data, and to direct, in another pass, the streamer vessel along the survey line in the same direction and the source vessel along a second source line for collecting different WAZ data and NAZ data.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to a seismic system that includes a single streamer vessel and a couple of source vessels that advance along a common survey line. However, those skilled in the art will understand that the embodiments to be discussed next are not limited to these configurations, but may be extended to any number of streamer vessels, source vessels, number of source arrays or other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to various embodiments described herein, methods and systems for positioning seismic source arrays, scheduling source array firings and determining vessel tow patterns for conducting seismic surveys are described. The methods and embodiments are based on configuring the receivers and source arrays to execute a same survey line at least twice, during a first pass having a wide azimuth configuration (WAZ) and during a second pass having a WAZ and a narrow azimuth configuration (NAZ). In another embodiment, the passes' order may be reversed. In still another embodiment, more passes may be used for the same survey line. In one embodiment, one pass collects only WAZ data and the other pass collects only NAZ data. The source arrays may be fired in a predetermined schedule (e.g., continuously or simultaneously or in an alternate manner, etc.) coordinated between all vessels while maintaining a preconfigured tow pattern. Such methods and systems can, for example, be used to improve target illumination (seismic data recorded in full azimuth), record near offset data (3D data set), reduce operational HSE exposure, generate higher availability for source array maintenance, greater shooting plan flexibility and faster data acquisition, resulting in lower costs.

Figure 1:
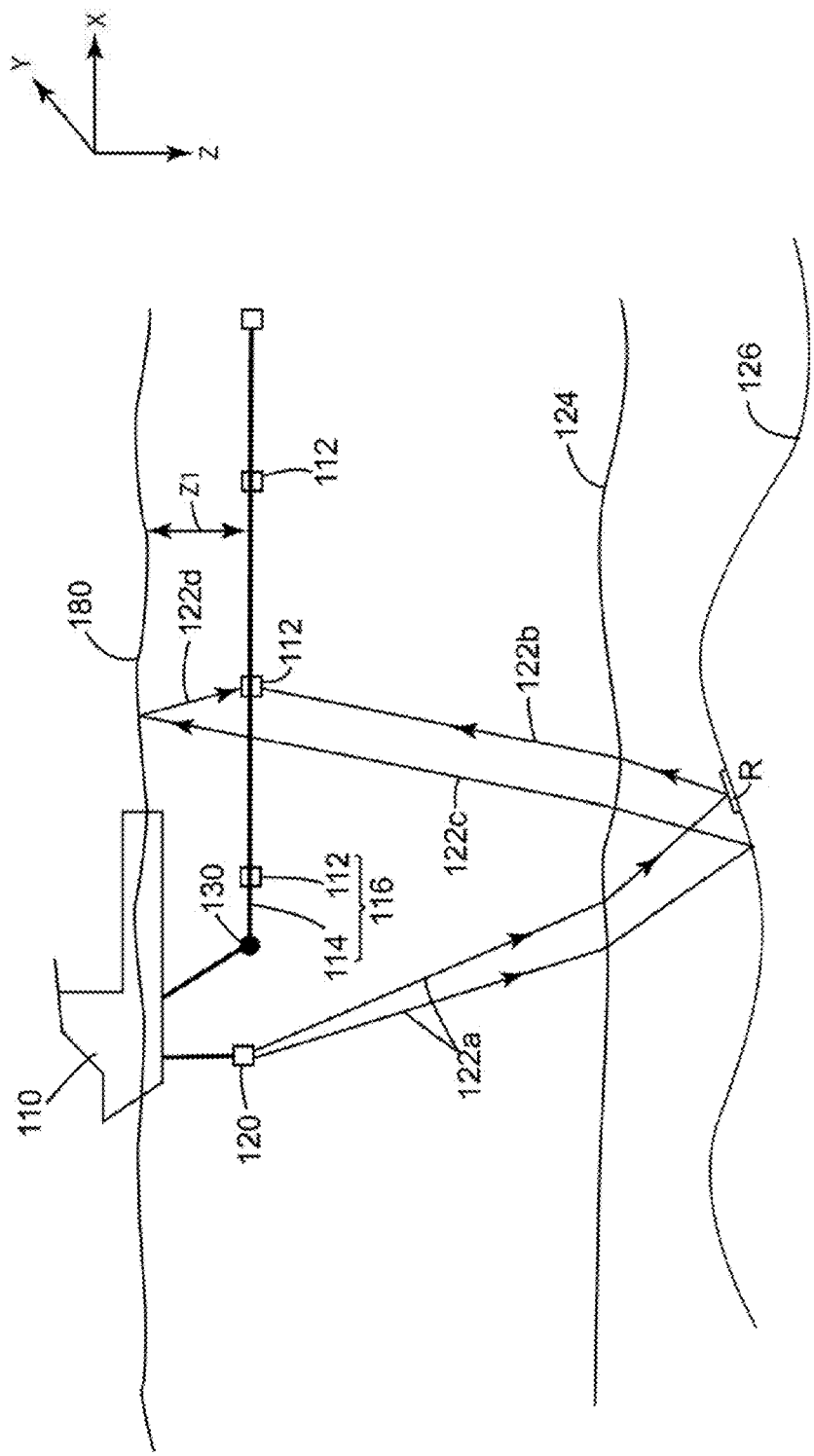
FIG. 1 is a schematic diagram of a seismic survey system having a streamer vessel and a seismic source.
Figure 2:
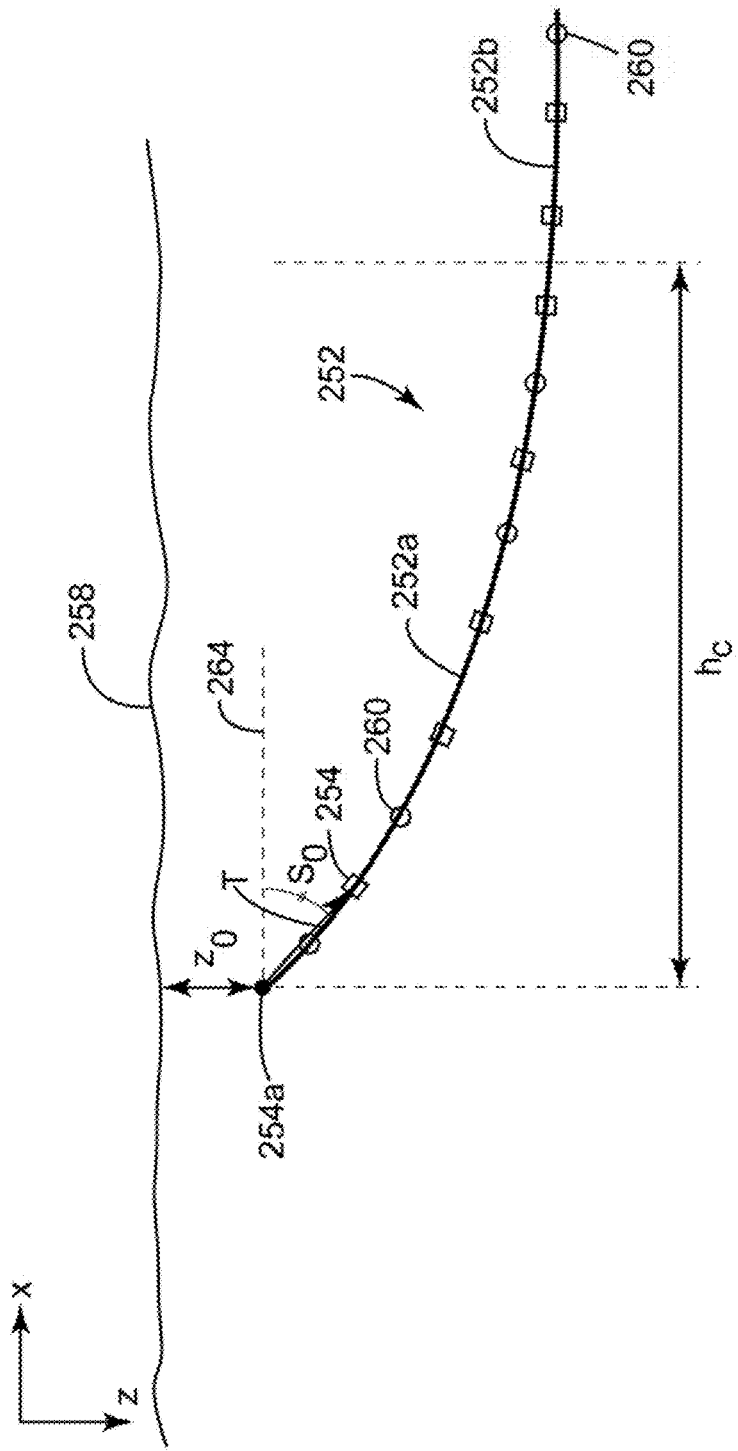
FIG. 2 is a schematic diagram of a variable-depth streamer.
Figure 3:
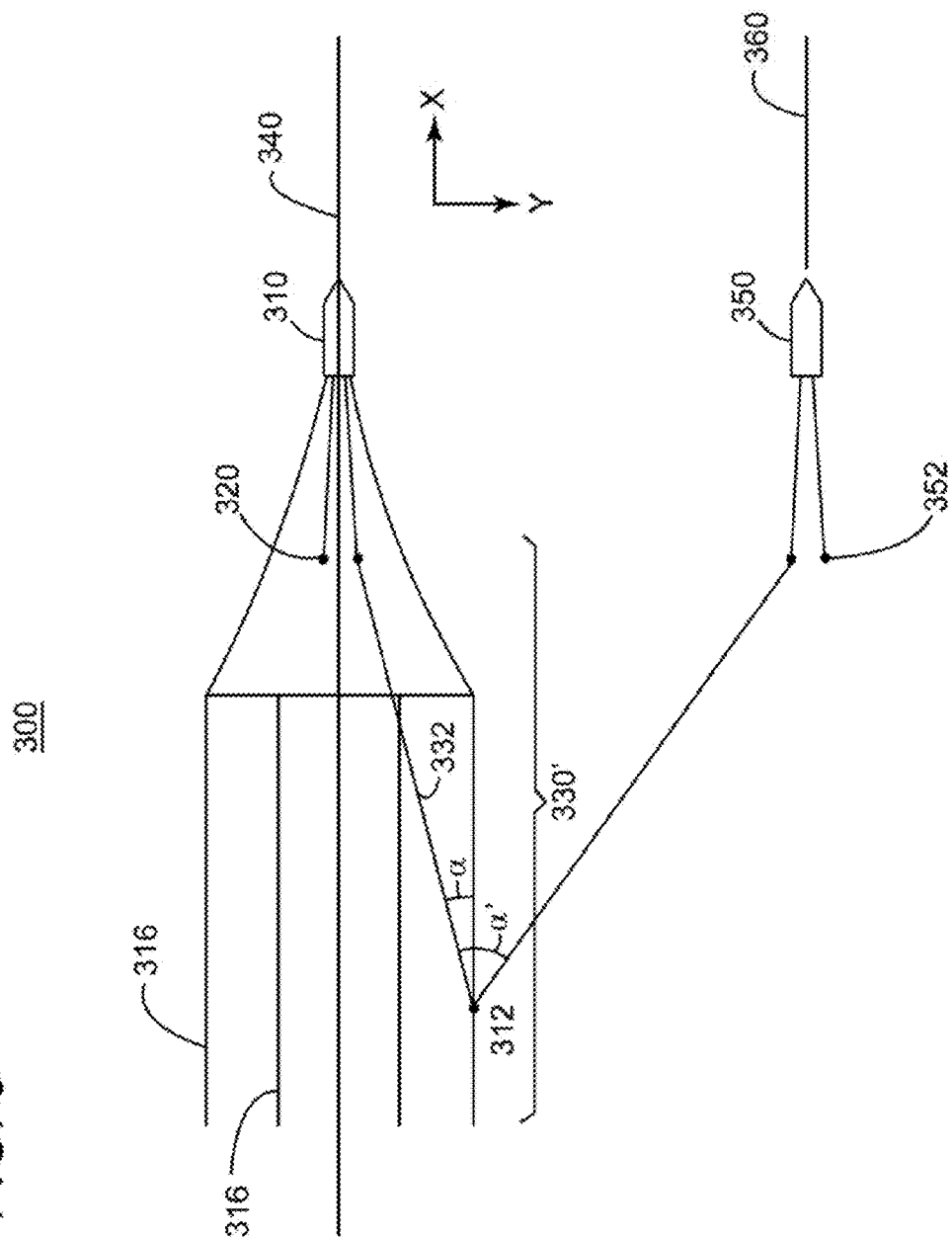
FIG. 3 is a schematic diagram of a seismic survey system having a streamer vessel and a source vessel.
Figure 4:
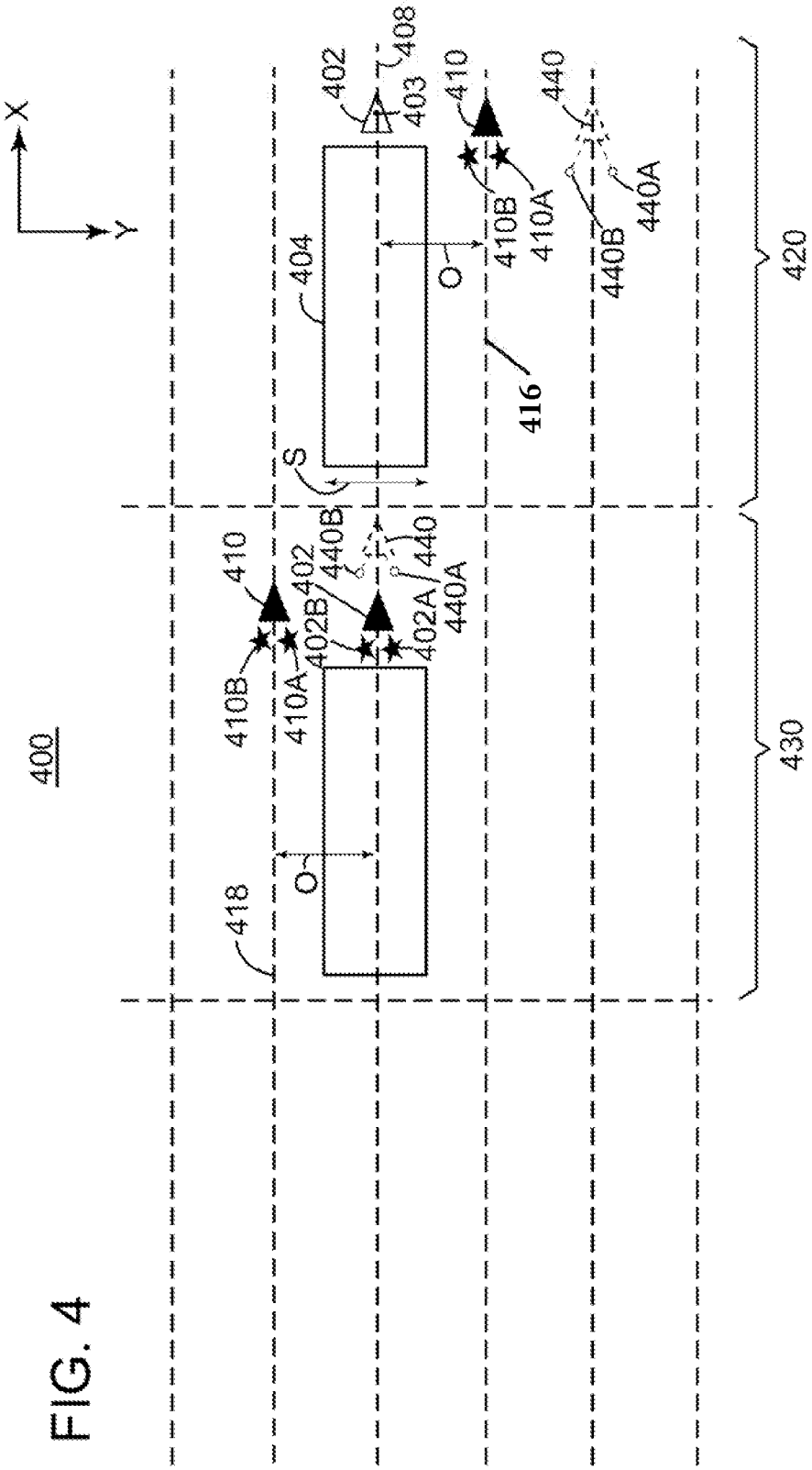
FIG. 4 is a schematic diagram of a seismic survey system configured to collect wide-azimuth (WAZ) data in one pass and narrow-azimuth (NAZ) data in another pass of a same survey line.

According to an embodiment illustrated in FIG. 4, a seismic survey acquisition system 400 includes at least a streamer vessel 402 that tows a streamer spread 404 along a survey line 408, and at least a source vessel 410 that tows source arrays 410A and 410B along a source line 416, which is parallel with survey line 408. Streamer vessel 402 may also tow its own source arrays 402A and 402B. In the following, a streamer vessel is understood to mean a vessel that tows at least a streamer, and a source vessel is understood to tow at least one source array. A streamer vessel may also tow source arrays and a source vessel may also tow streamers. Seismic data acquisition may take place according to different schemes to be discussed now. The vessel and source array configuration shown in FIG. 4 may be changed from scheme to scheme, as also will be discussed.

According to a first scheme illustrated in FIG. 4, streamer vessel 402 follows, during a first pass 420, survey line 408, while source vessel 410 follows, during the same first pass 420, source line 416. Source line 416 is offset by distance O along a cross-line direction Y from survey line 408. Offset O may be, for example, about 1200 m. In another embodiment, offset O is substantially the same size as a width S of seismic spread 404. In still another embodiment, a relation between offset O and width S is given by $$O = \frac{S}{a},$$

where a is a real number, e.g., 1, 2, ½, etc. During a second pass 430 of the same survey line 408, streamer vessel 402 fires its sources 402A and 402B (if present), and source vessel 410 follows a new source line 418, e.g., has changed its cross-line position relative to survey line 408. In one application, the new source line 418 is offset by O relative to survey line 408 but in opposite direction relative to survey line. By locating the source lines 416 and 418 on the port and starboard during two different passes, the azimuth diversity is improved. Note that in one embodiment, the offset between survey line 408 and source line 416 is different than the offset between survey line 408 and source line 418.

A controller 403, which happens to be shown in FIG. 4 located on streamer vessel 402, may be configured to coordinate the positions of the streamer and source vessels in each pass to achieve the above-discussed scheme. In one application, controller 403 may be distributed on more vessels participating in the acquisition campaign. In still another application, the controller 403 may be distributed on each vessel participating in the acquisition campaign. In one embodiment, controller 403 includes a processor (i.e., hardware) and dedicated instructions (i.e., software) for implementing the selected scheme.

The seismic data acquired during the first pass 420 is WAZ data because of source vessel 410, while the seismic data acquired during second pass 430 includes WAZ data due to source vessel 410, but also includes NAZ data due to the shooting of sources 402A and B of streamer vessel 402. Thus, rich azimuth (RAZ) data is acquired by having the two passes illustrated in FIG. 4. Note that the order of these two passes is irrelevant, i.e., the same results are obtained if the first pass is WAZ+NAZ and the second pass is WAZ only.

In one embodiment, a second source vessel 440 may be used to tow sources 440A and 440B along survey line 408 instead of using sources 402A and 402B. In other words, streamer vessel 402 may tow no source arrays, in which case the second source vessel 440 supplies the necessary sources for NAZ data acquisition. Vessel 440 may be positioned ahead of behind vessel 402. In this case, second source vessel 440 may also be used during the first pass 420 to further improve the WAZ data.

Figure 5:
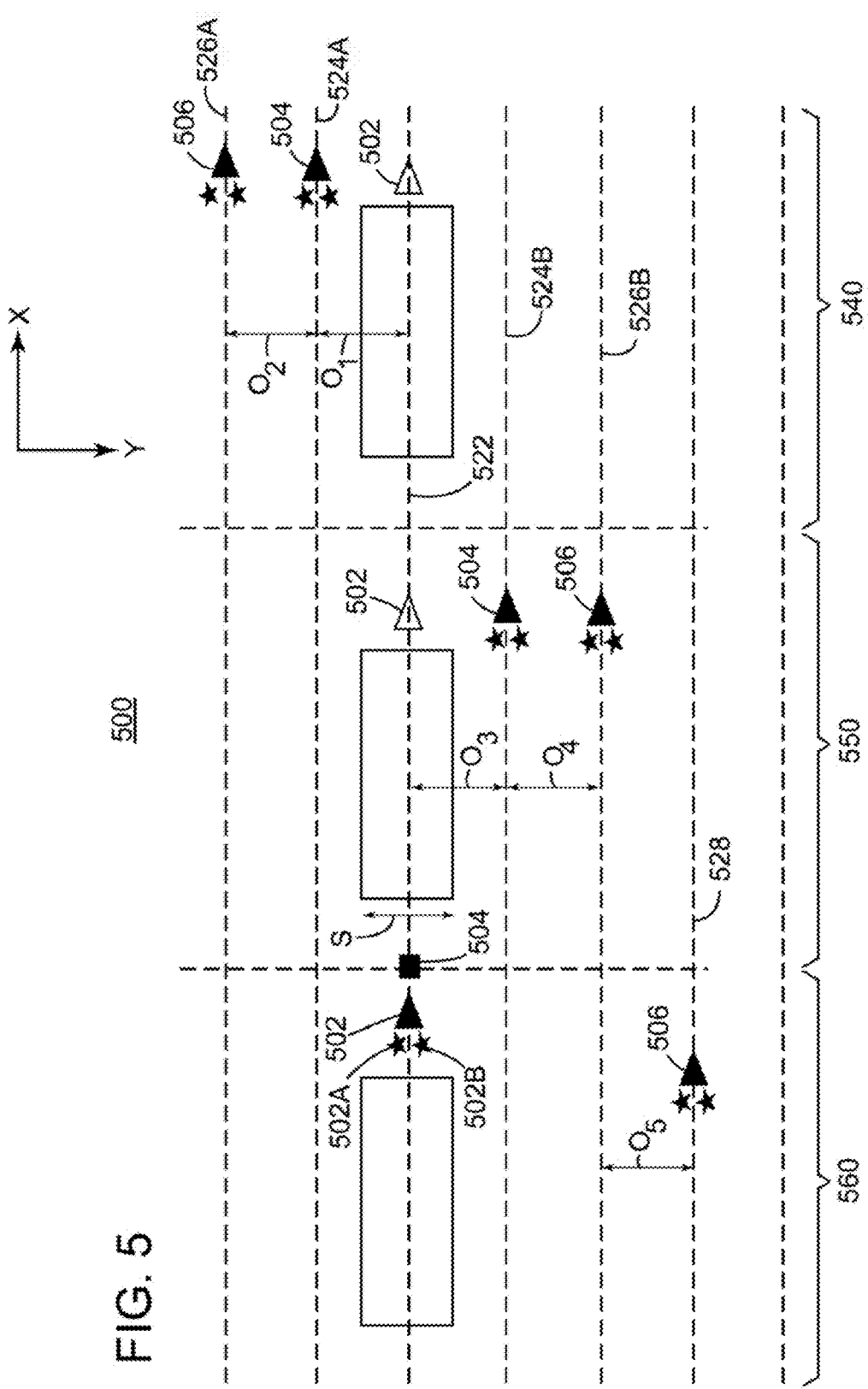
FIG. 5 is a schematic diagram of another seismic survey system configured to collect WAZ data in one pass and NAZ data in another pass of a same survey line.
Figure 6:
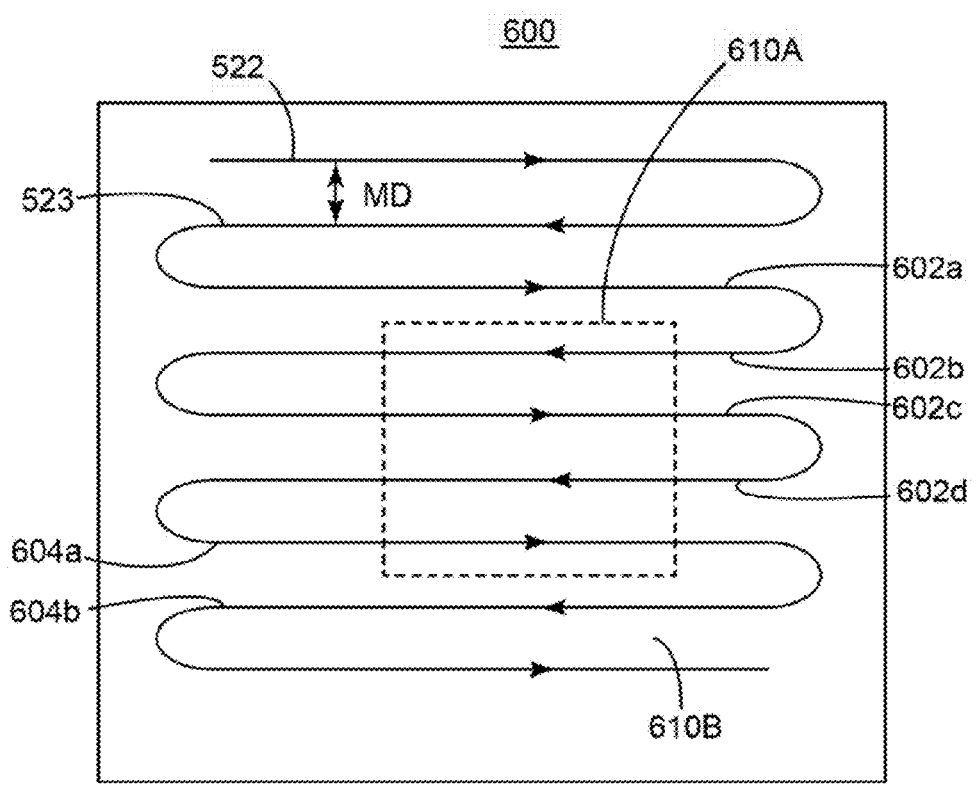
FIG. 6 is a schematic diagram of a seismic survey area having plural seismic survey lines.

More than two passes and more source and/or streamer vessels may be used to perform the seismic acquisition as illustrated in the next figures. For example, FIG. 5 illustrates a seismic acquisition system 500 in which three passes 540, 550 and 560 are performed for a survey line. In one application, three passes are performed for each survey line. Note that it is possible to have a different number of passes for different survey lines, e.g., as illustrated in FIG. 6, part of the survey lines 602a-d may have two passes and other survey lines 604a-b may have three passes. In an alternative embodiment, an interior area 610A of survey area 600 has two passes, and an exterior area 6108 of survey area 600 has three passes. More than three passes may be used for selected survey lines or areas. Still with regard to FIG. 6, note that one survey line 522 is followed by the streamer vessel along a positive direction while an adjacent survey line 523 is followed by the streamer vessel along a negative direction, i.e., in an anti-parallel mode.

Returning to FIG. 5, the acquisition system 500 includes a streamer vessel 502 and two source vessels 504 and 506. Streamer vessel 502 follows survey line 522, while source vessels 504 and 506 follow source lines 524A, 524B, 526A, 526B and 528, depending upon which pass is being performed. The source lines are offset along a cross-line direction Y by one or more corresponding offset distances $O_1$ to $O_5$ from survey line 522. In one embodiment, all offset distances $O_1$ to $O_5$ are equal to each other but they may be along different directions from the survey line. In another embodiment, the offset distances $O_1$ to $O_5$ are proportional to the spread width S, as already discussed above. Each source vessel may tow one or more source arrays. The streamer vessel may tow or not corresponding source arrays. For example, as shown in FIG. 5, if streamer vessel 502 has its own sources 502A and 502B, they are not activated during first and second passes 540 and 550, but only during third pass 560. Thus, according to this configuration, the first and second passes acquire WAZ data, while WAZ and NAZ data is acquired during third pass 560. Again, passes' order along a same survey line may differ from FIG. 5, or they may change from a line survey to another line survey during the same survey.

In a variation of this embodiment, source arrays 502A and 502B of streamer vessel 502 may actually be the source arrays of one of source vessels 504 or 506. For example, in third pass 560, source vessel 504 follows survey line 522, e.g., ahead of streamer vessel 502, while source vessel 506 follows source line 528. Source vessels 504 and 508's roles may be changed in another embodiment.

Note that all three passes along the survey line 522 follow the same inline direction X. The number and length of streamers may vary from survey to survey. For example, it is possible to have 12 streamers separated by 100 m, each having a length of about 8100 m. A constant cross-line offset of 1200 m may be used for $O_1$ to $O_5$, and a shot point interval between two adjacent source arrays may be about 25 m. A record length may be about 10 s. All these numbers are exemplary and not intended to limit the applicability of the embodiments.

When the system shown in FIG. 5 changes from survey line 522 to a next survey line 523 as illustrated in FIG. 6, a move-up or move-down distance MD is applied to offset the old and new survey lines. In one application, this distance MD may be about half the width S of the streamer spread. In another application, the distance MD may be half of any the cross-line offsets $O_1$ to $O_5$. For example, the distance MD may be 600 m, and any of the cross-line offsets $O_1$ to $O_5$ may be 1200 m. Other numbers may be used for these distances.

Figure 7:
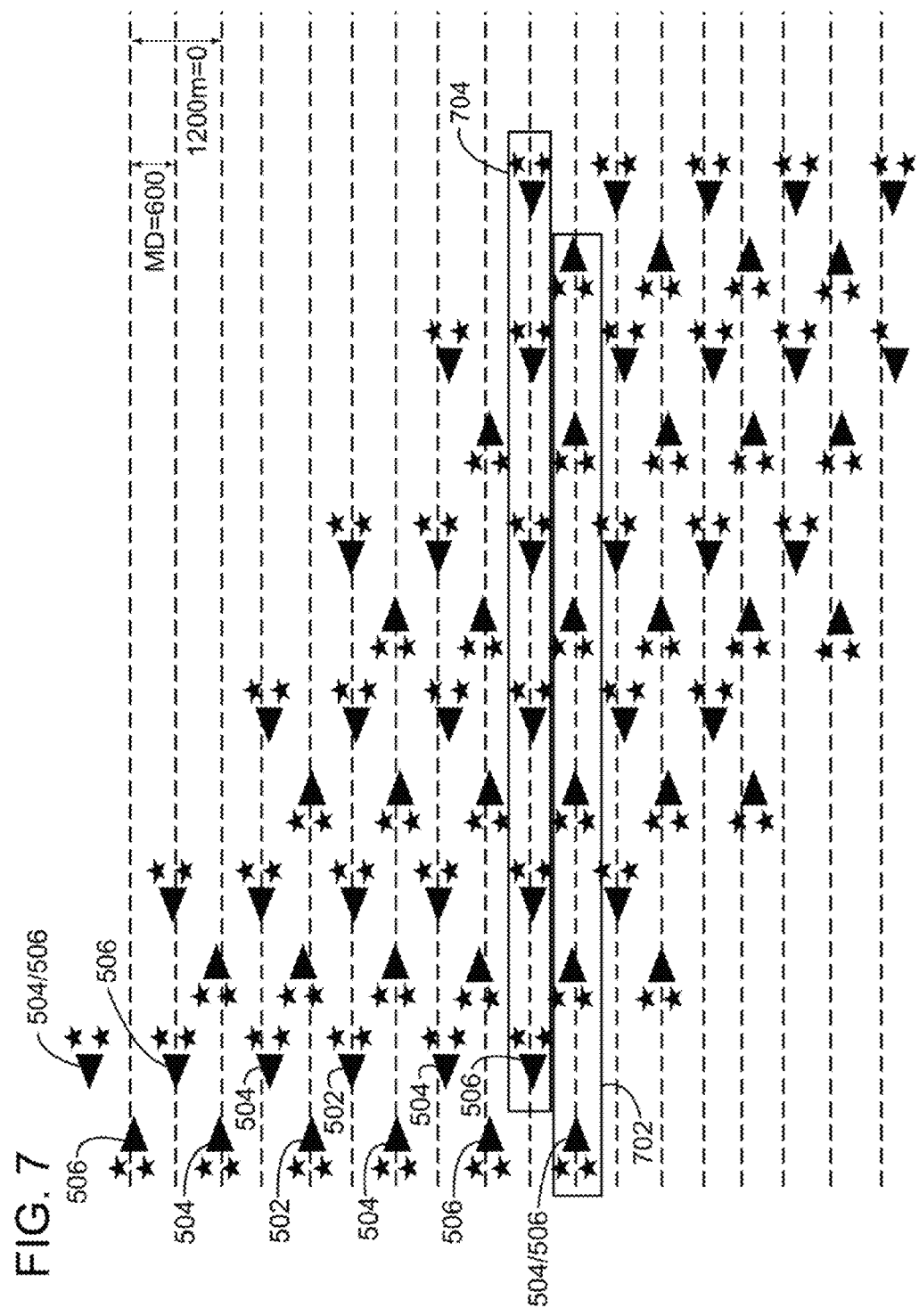
FIG. 7 illustrates super-shots obtained with a seismic survey system that collects both WAZ and NAZ data in different passes of the same survey line.

If all the passes for a couple of survey lines are considered, where two consecutive or adjacent survey lines are acquired in an anti-parallel configuration (for example, as illustrated in FIG. 6), a possible shooting pattern is as illustrated in FIG. 7. The anti-parallel shooting pattern implies that the survey lines are interleaved in opposite directions. This shooting pattern indicates that each source array is shot while the others are not, for example, at 100 m. Thus, FIG. 7 illustrate a super-shot 702 corresponding to three passes 540, 550, and 560 along survey line 522 (in FIG. 6) and a super-shot 704 corresponding to three other passes along anti-parallel survey line 523 (see FIG. 6). Note that this specific arrangement has a move-up distance MD, i.e., the next survey line 523 is above first survey line 522 along the cross-line direction Y. Those skilled in the art would recognize that it is possible for the next survey line 523 to be below first survey line 522.

Figure 8:
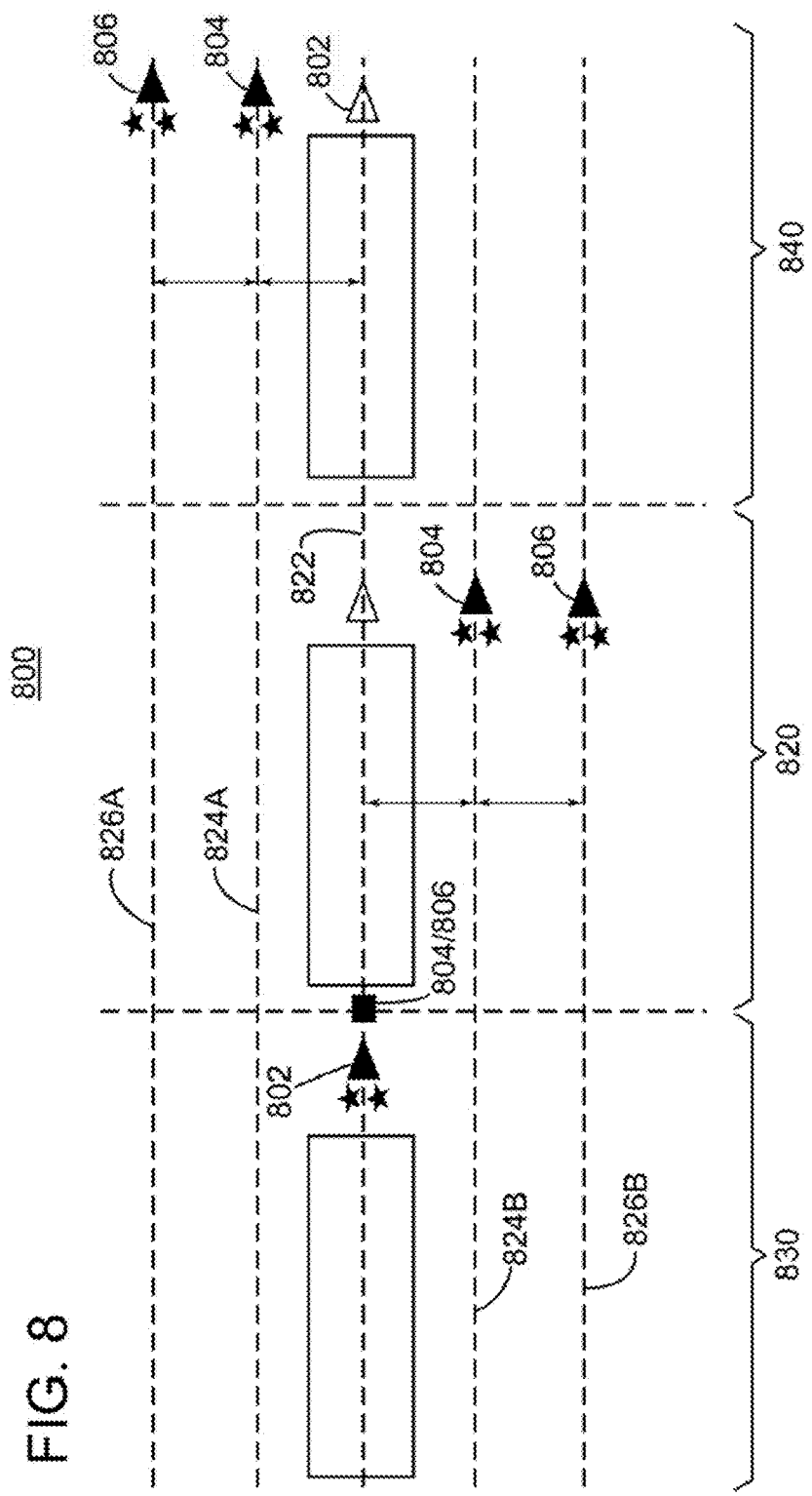
FIG. 8 is a schematic diagram of still another seismic survey system configured to collect WAZ data in one pass and NAZ data in another pass of a same survey line.

The FIG. 5 configuration may be further modified as illustrated in FIG. 8. According to this embodiment, one pass 820 acquires WAZ data, while another pass 830 acquires only NAZ data. This means that during pass 830, there is no source vessel along source lines 824A, 824B, 826A or 826B, which are different from survey line 822. One or more source arrays are towed along survey line 822 either by streamer vessel 802 or by one of source vessels 804 or 806 as illustrated in pass 830. One or more further passes 840 may be employed for survey line 822. FIG. 8 shows the third pass 840 being a WAZ pass, but the third or next pass may be any one of a WAZ+NAZ or NAZ or WAZ pass.

Figure 9:
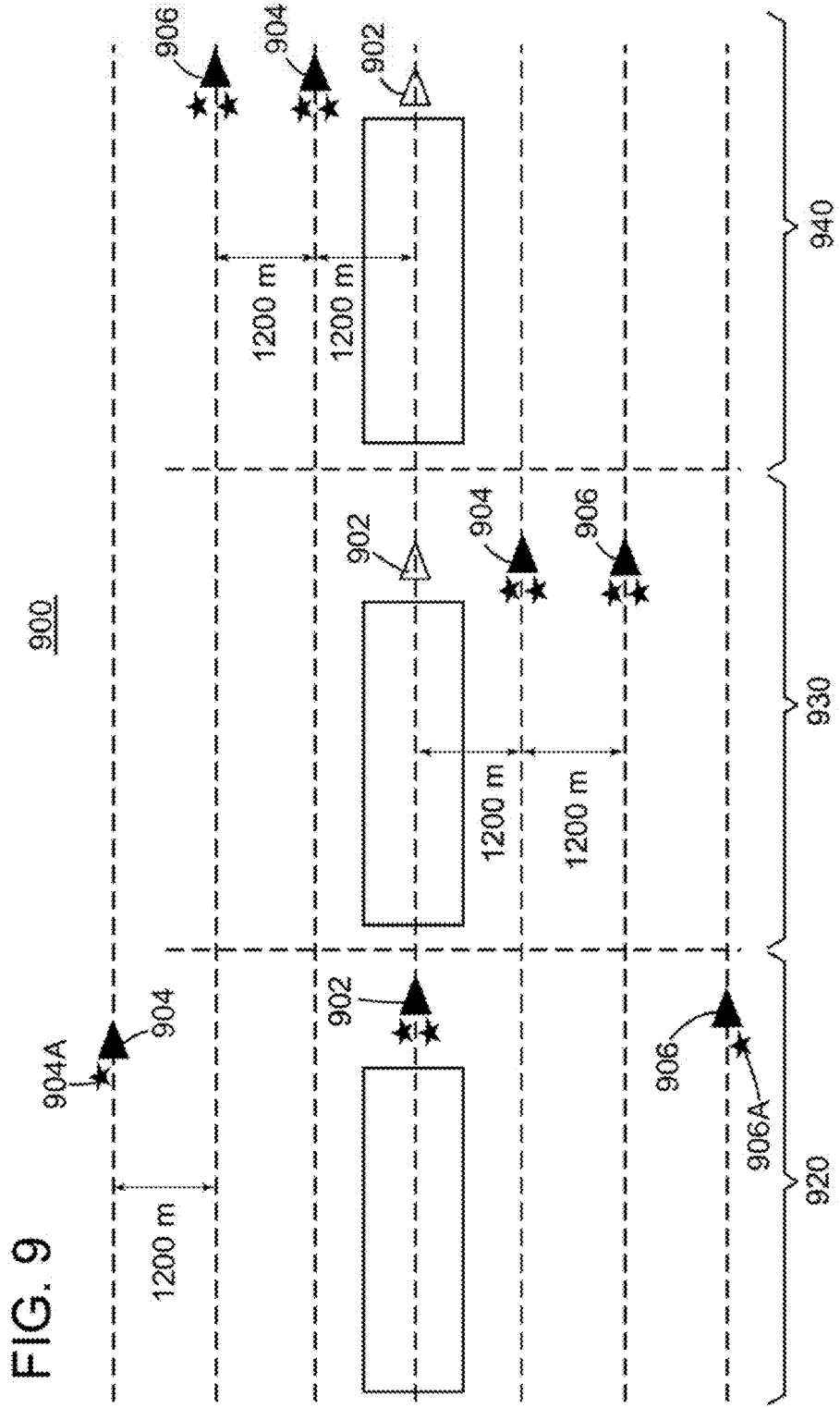
FIG. 9 is a schematic diagram of yet another seismic survey system configured to collect WAZ data in one pass and NAZ data in another pass of a same survey line.

With the streamer and source vessels illustrated in FIG. 8, it is also possible to implement the configuration illustrated in FIG. 9, i.e., during each pass to have both source vessels 904 and 906 actively shooting their sources. With this configuration, pass 920 acquires both WAZ and NAZ data, while pass 930 acquires only WAZ data. Pass 940 may be optional. Also note that FIG. 9 illustrates source vessels 904 and 906 shooting only one respective source array, and streamer vessel 902 having its own source arrays that are shot only during pass 920. The same may be true for any pass for any of the discussed embodiments, i.e., a source or streamer vessel does not have to shoot all its source arrays during a pass if multiple source arrays are attached to the vessel. The cross-line distances between the source lines and survey line are illustrative and not intended to limit the present embodiments.

Figure 10:
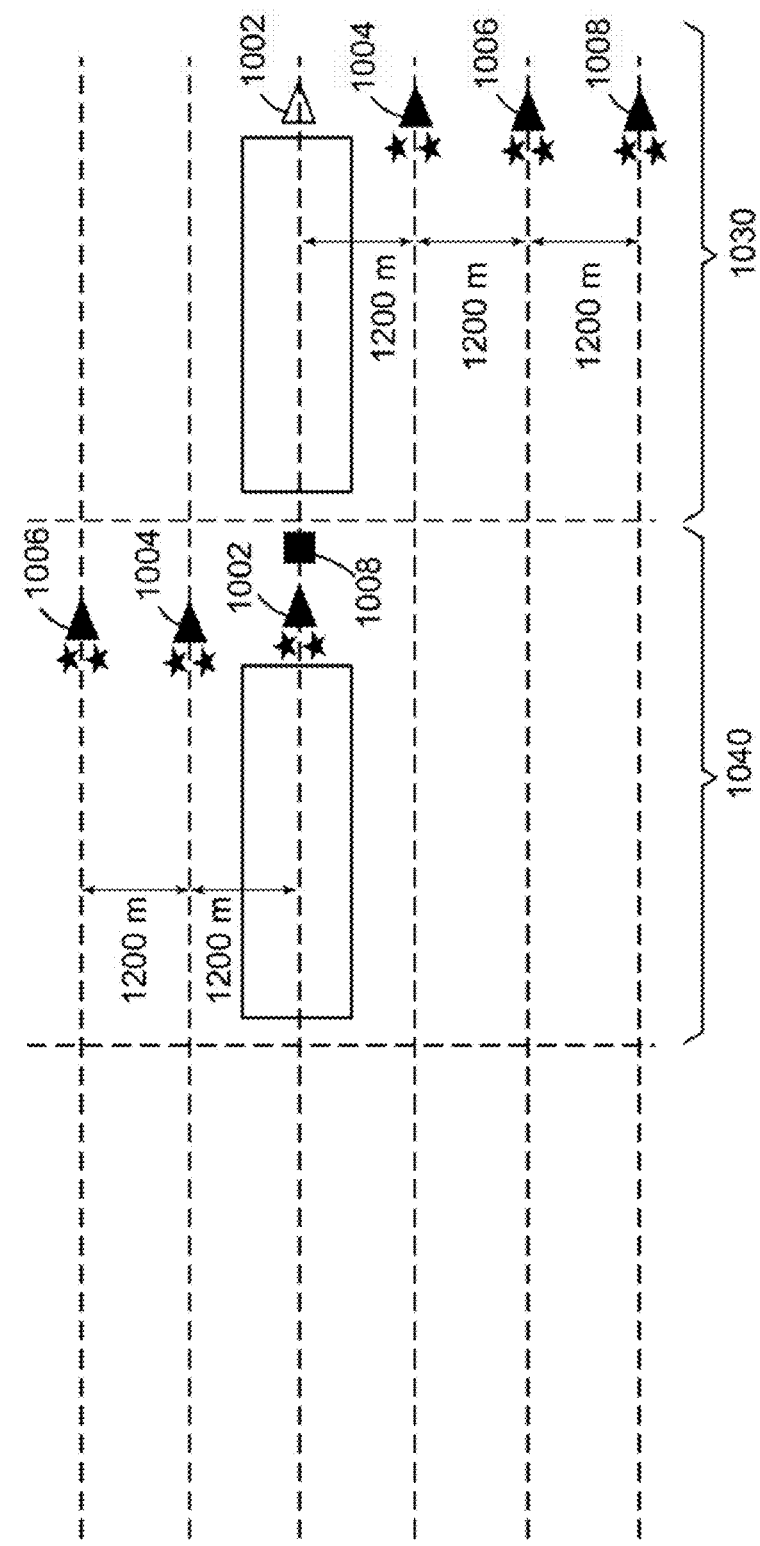
FIG. 10 is a schematic diagram of a seismic survey system having plural source vessels for collecting WAZ data in one pass and NAZ data in another pass of a same survey line.

The number of source vessels and their positions may vary from survey to survey. For example, the system shown in FIG. 4 has one or two source vessels, while the systems shown in FIGS. 5 and 8 have two source vessels. However, it is possible to have more than two source vessels as illustrated, for example, in FIG. 10. Although FIG. 4 shows a single streamer vessel 402 and a single source vessel(s) 410, according to the embodiment illustrated in FIG. 10, a WAZ pass 1030 includes one streamer vessel 1002 and three source vessels 1004, 1006 and 1008, and a WAZ+NAZ pass 1040 includes the same vessels, with source vessel 1008 following the same line as streamer vessel 1002. As already discussed above, there is no limitation on the number of streamer and/or source vessels. Also, there is no limitation on the cross-line offset between the source lines and the survey line, and also there is no limitation on the actual location of the source vessels relative to the streamer vessel. While FIG. 10 shows all the source vessels located on one or the other side of the streamer vessel during each pass, it is possible to have the source vessels spread around the streamer vessel as in pass 920 in FIG. 9. Any positioning of the source vessels relative to the streamer vessel is possible as long as at least one pass acquires WAZ data and another pass acquires WAZ+NAZ or only NAZ data.

Figure 11:
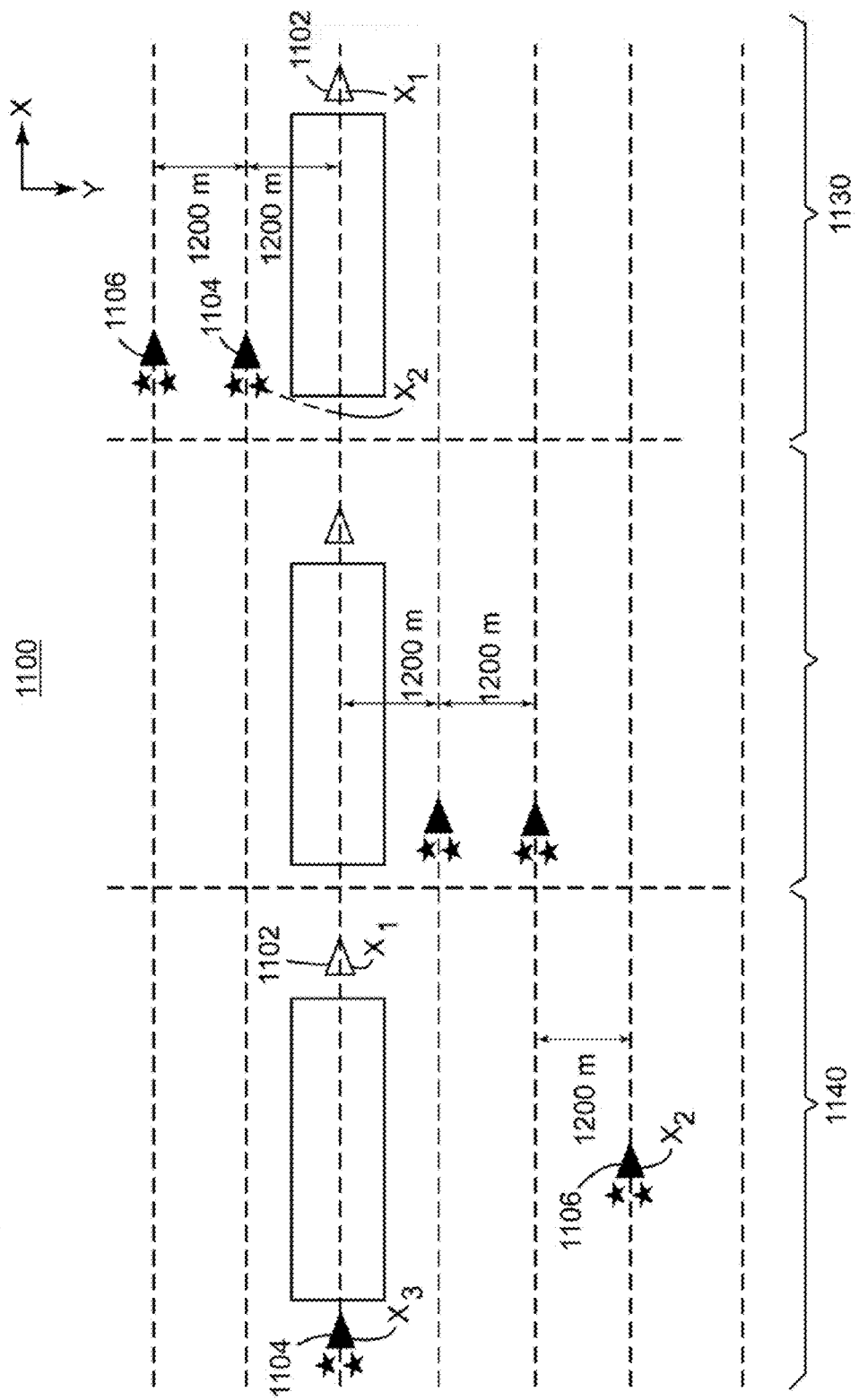
FIGS. 11 and 12 are schematic diagrams of other seismic survey systems having plural source vessels for collecting WAZ data in one pass and NAZ data in another pass of a same survey line.

The embodiment of FIG. 11 shows that the inline locations of the source vessels relative to the streamer vessel can be different. More specifically, during WAZ pass 1130, streamer vessel 1102 has a first inline position $X_1$, while source vessels 1104 and 1106 have a second, common inline position $X_2$, different than $X_1$. In another pass 1140, each vessel has its own inline position $X_1$ to $X_3$. Note that source vessels may be ahead of or behind the streamer vessel. In one application, the source vessel(s) and the streamer vessel have the same inline position. In another application, the source vessels have the same inline position as some of the streamers. Any combination of inline positions is possible for each pass. The inline positions may be the same from pass to pass, or they may change from pass to pass. The same is true for the survey lines.

Figure 12:
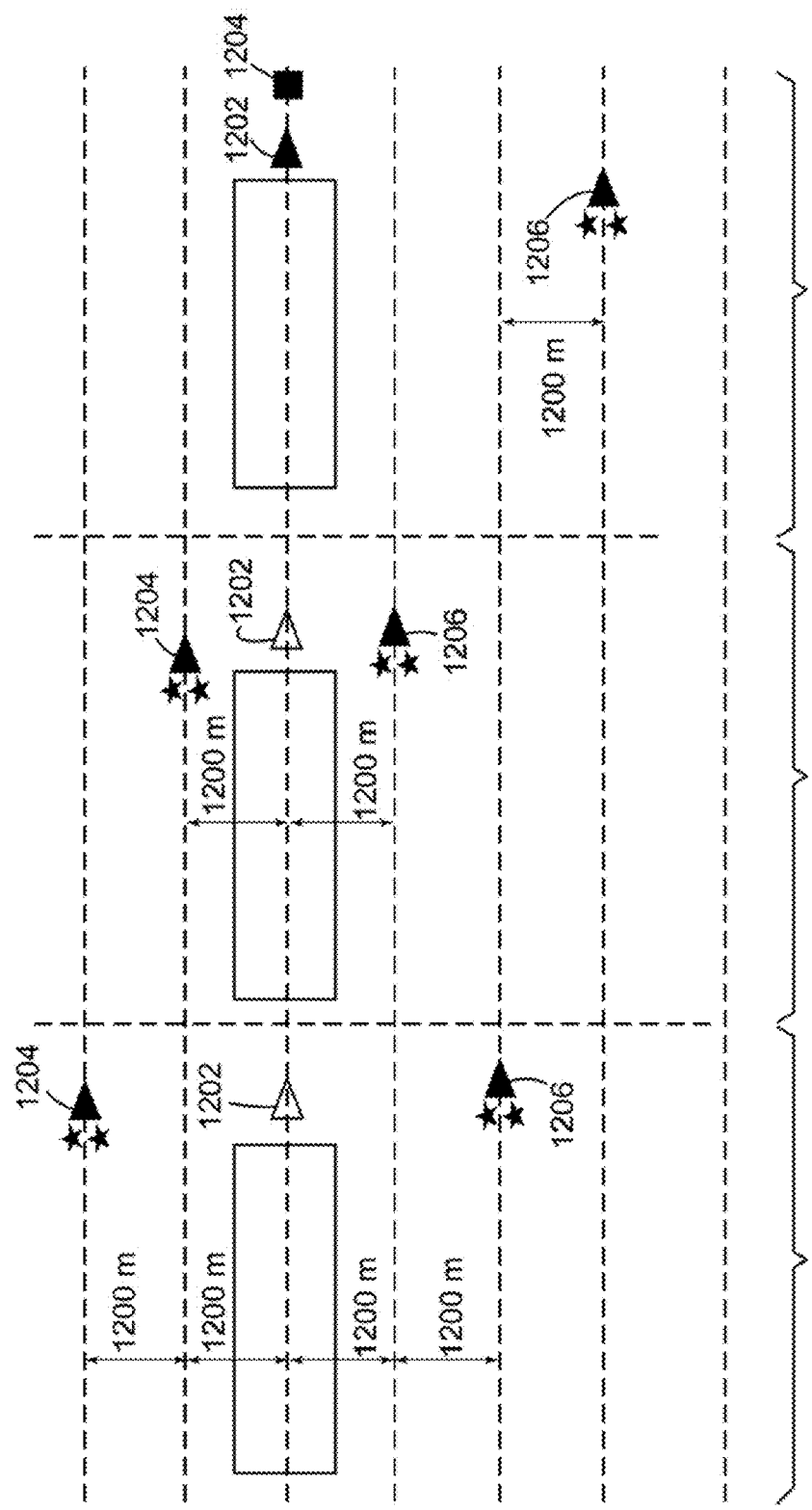
Figure 13:
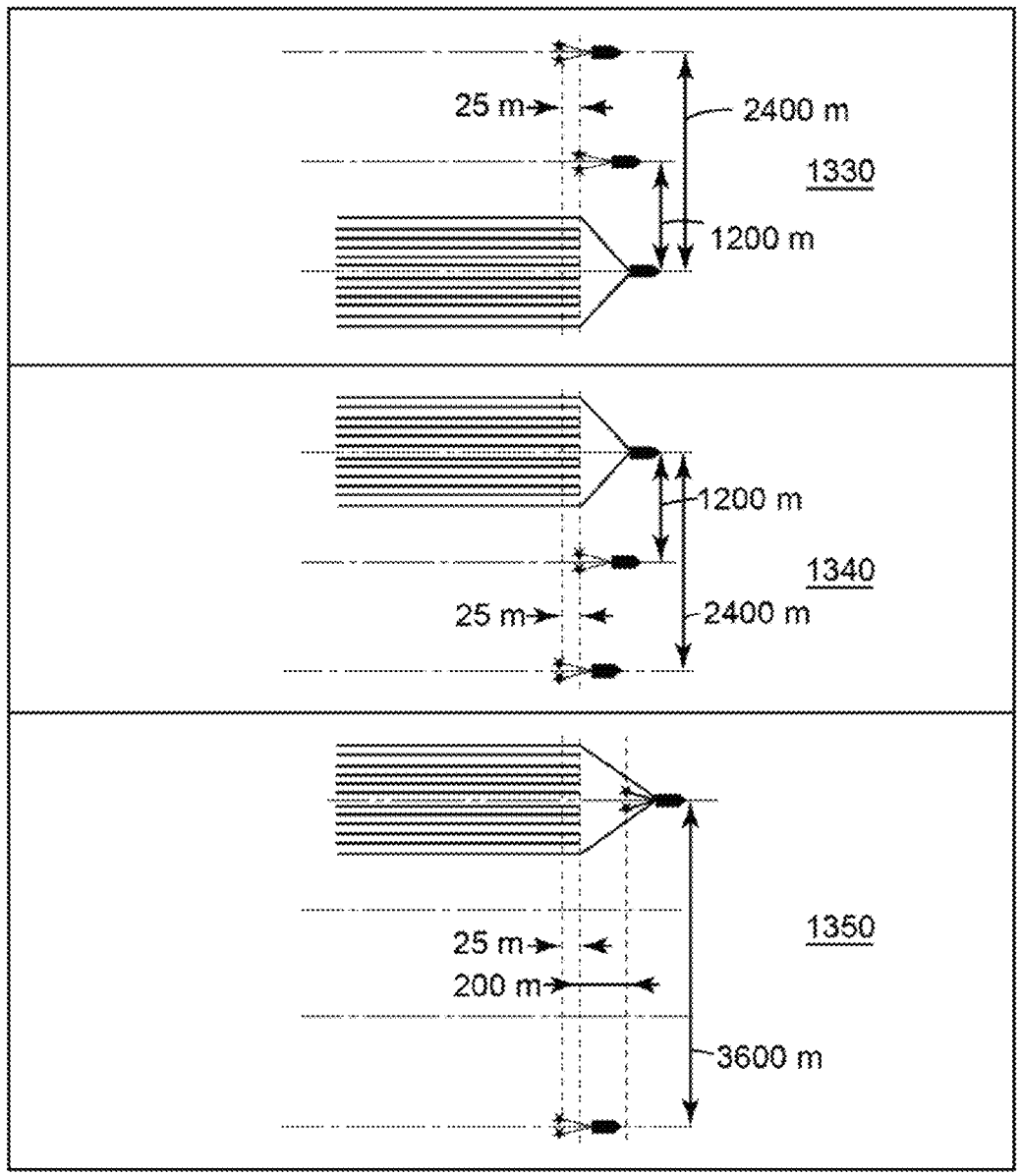
FIG. 13 is a schematic diagram illustrating staggered source vessels along an inline direction.

FIG. 12 illustrates another embodiment in which the cross-line positions of the source vessels 1204 and 1206 change relative to the streamer vessel 1202 from pass to pass (note that source vessel 1204 may be present or not when NAZ data is collected), and FIG. 13 illustrates still another embodiment in which the inline positions of the source vessels are staggered relative to the streamer vessel so that they are different from pass 1330 to pass 1340 and to pass 1350. In this embodiment, the inline positions are staggered by 25 m so that a super-shot pattern can be built. Other inline, cross-line and offsets may be imagined for each of or all the passes so that (i) one pass acquires NAZ data and another pass acquires WAZ data or (ii) one pass acquires WAZ+NAZ data and another pass acquires WAZ data.

Regarding the shooting of the source arrays during the various passes performed for a same survey line, as already discussed above, there are many possible schemes to be employed. However, according to one scheme, and considering the system illustrated in FIG. 5, for pass 540, a single source array of source vessel 504 fires at inline position X, then a single source array of source vessel 506 fires at inline position X+Δx, then another single source array of source vessel 504 fires at inline position X+2Δx, and then another single source array of source vessel 506 fires at X+3Δx, where Δx can take any value, for example, 25 m. If Δx is 25 m, this means that the source arrays towed by source vessels 504 and 506 start shooting again after 100 m, and they shoot in a flip-flap-flup-flop manner.

Figure 14:
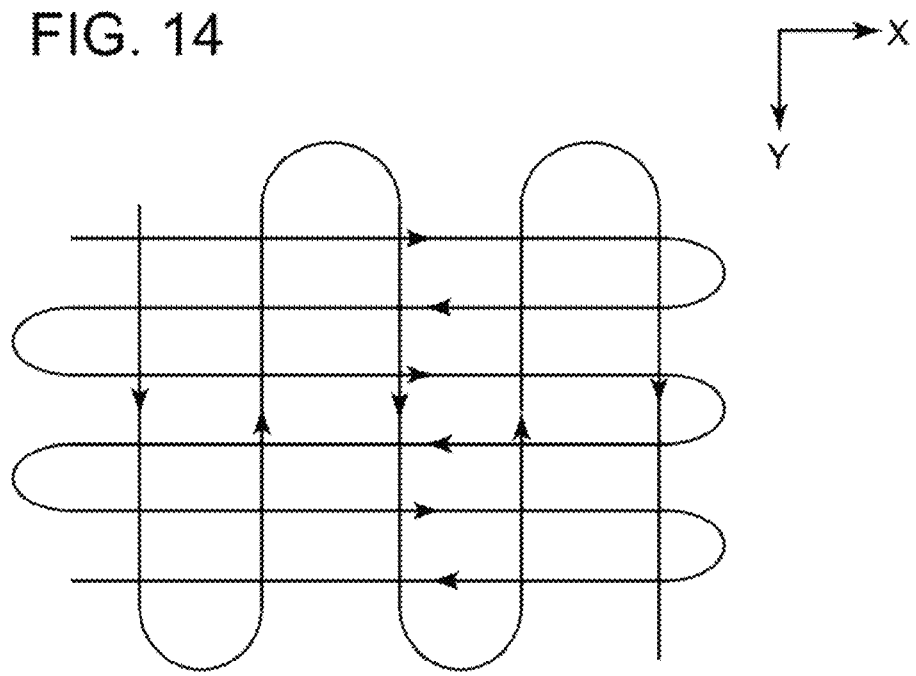
FIG. 14 is a schematic diagram illustrating anti-parallel survey lines and also perpendicular survey lines for a same seismic acquisition campaign.
Figure 15:
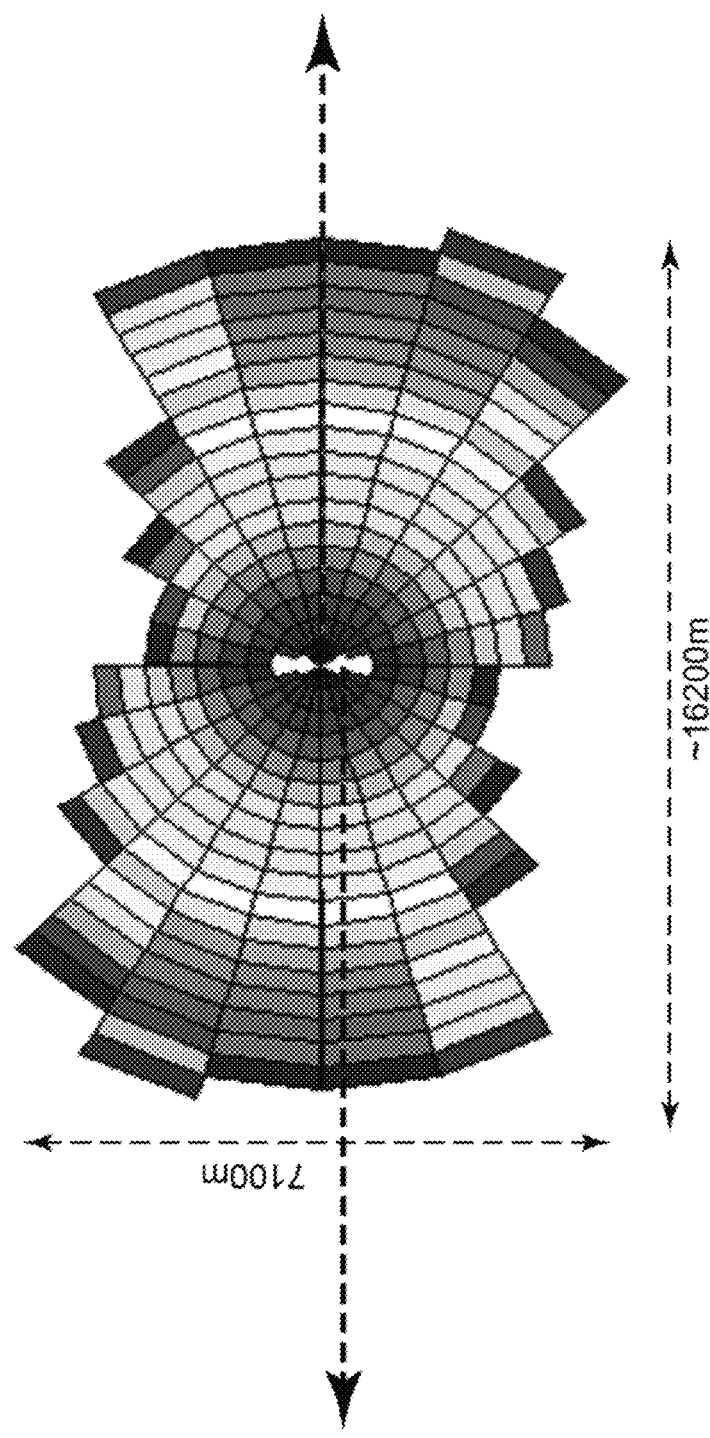
FIG. 15 is a rose diagram illustrating the WAZ data when two anti-parallel survey lines are surveyed.
Figure 16:
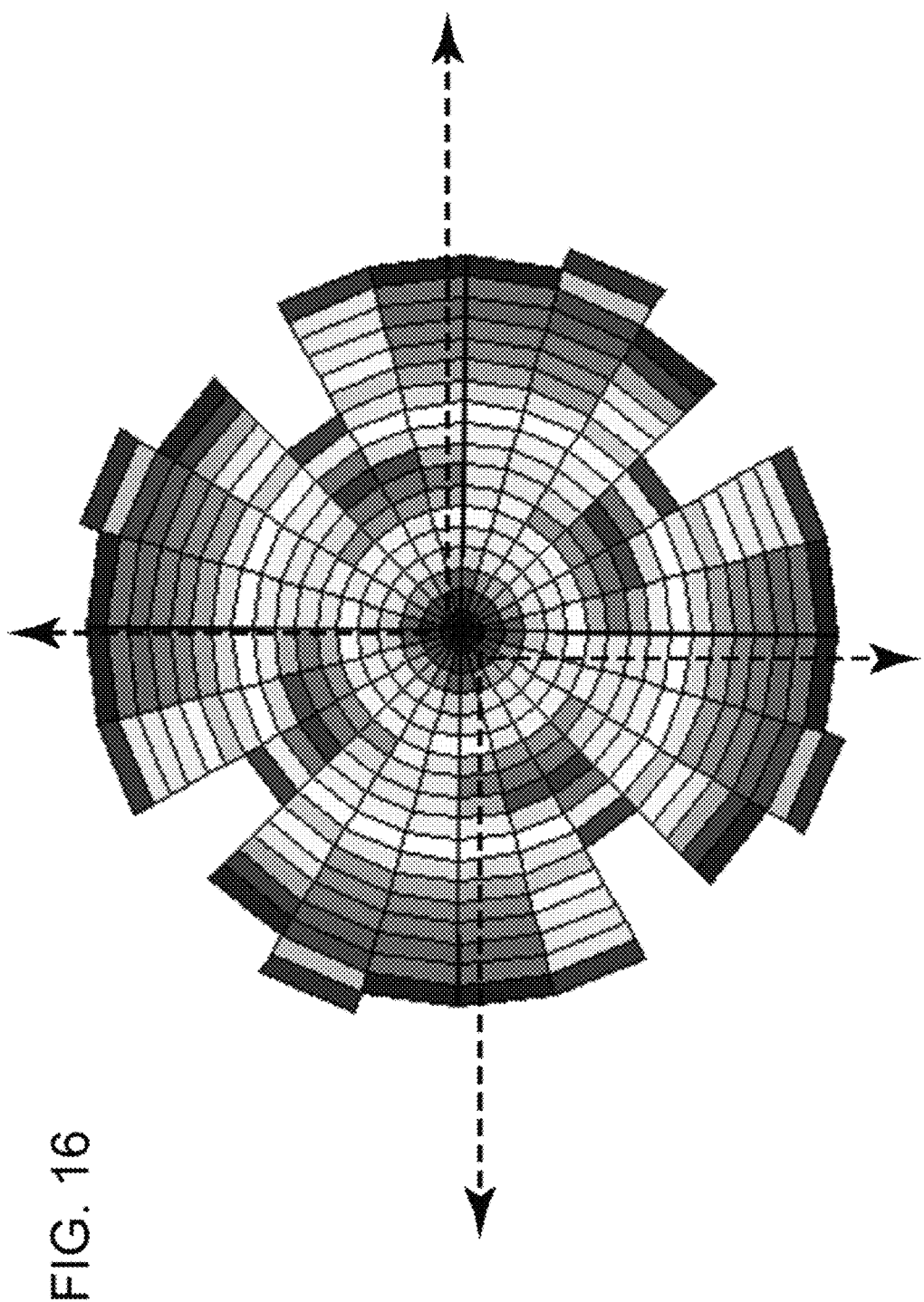
FIG. 16 is a rose diagram illustrating the WAZ data when two sets of anti-parallel survey lines are surveyed, the two sets being perpendicular to each other.

Regarding the survey lines followed by the various passes and also illustrated in FIG. 6, note that one or more of the acquisition configurations described above acquire higher quality data if the survey lines extend in two orthogonal directions X and Y as illustrated in FIG. 14. In this regard, FIG. 15 is a rose graph in which the targets are illuminated in a 180° azimuth sector along two anti-parallel survey lines to obtain two super-shot gathers, and FIG. 16 is also a rose graph in which four super-shot gathers are acquired in opposite and orthogonal directions. A comparison of FIGS. 15 and 16 shows that the coverage of the seismic acquisition area is more complete with the WAZ+NAZ perpendicular acquisition.

Figure 17:
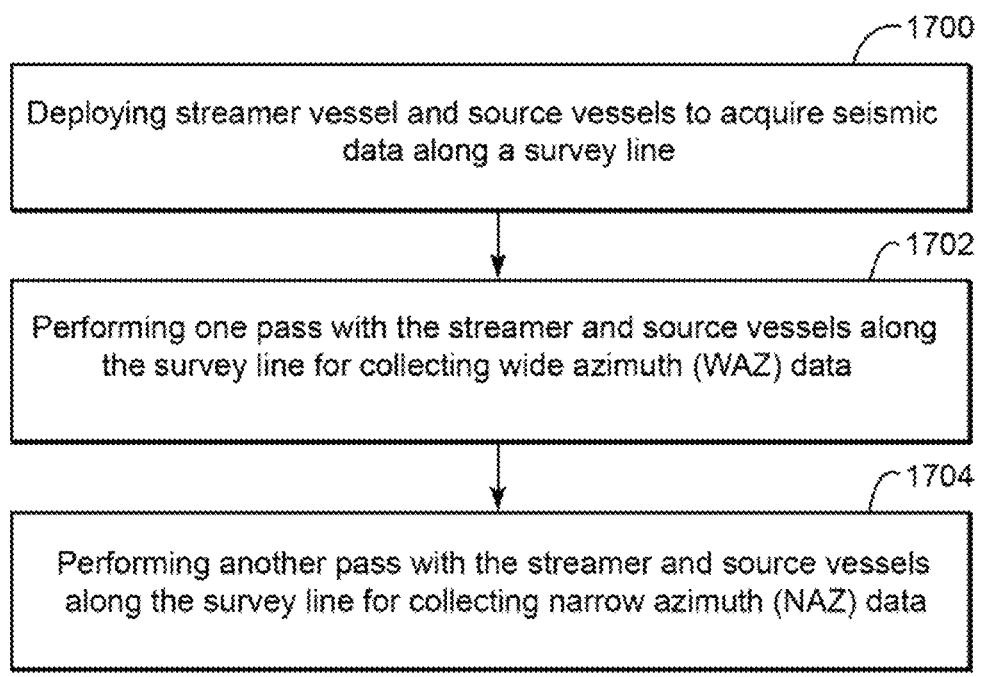
FIG. 17 is a flowchart of a method for collecting WAZ data in one pass and NAZ data in another pass of a same survey line.

A method for acquiring seismic data over a survey area during a seismic survey is now discussed with regard to FIG. 17. The method includes a step 1700 of deploying streamer vessel and source vessels to acquire seismic data along a survey line, a step 1702 of performing one pass with the streamer and source vessels along the survey line for collecting wide azimuth (WAZ) data, and a step 1704 of performing another pass, during the same or a different seismic survey, with the streamer and source vessels along the survey line for collecting narrow azimuth (NAZ) data.

The anti-parallel shooting pattern implies that the survey lines are interleaved in opposite directions, as already discussed above. The same may be true for the source lines corresponding to different survey lines. Also note that if the survey acquisition is implemented with three passes for each survey line, it may be advantageous that during each pass, each source array follows a different source line, i.e., a source line from a pass is not reused in another pass for the same survey line. As already discussed above, the number of passes can change from survey to survey and from survey line to survey line, with at least one survey line having at least two passes.

The following comments apply to one or more embodiments discussed above. The streamer towed by the streamer vessel may include a receiver capable of recording particle velocity data to be later used for processing. The particle velocity data may be from individual receivers, or summed (average or weighed sum) to form a receiver group. The particle velocity data may have been acquired directly or may be computed from accelerometer sensors (for example by integration). Other types of particle motion sensors may be available. The receivers are distributed along one or more towed streamers with constant or variable depth (e.g., slant streamer, curved profile, horizontal streamer or a combination of them). In one application, the streamers are towed in a fan configuration, i.e., the heads of the streamers are spaced cross-line with a first separation and the tails of the streamers are spaced cross-line with a second separation, greater than the first separation. The source array may include one or more source elements, where a source element may be an air gun, marine vibrator or other element. The source elements may be distributed at a same depth or they may have different depths, i.e., a multi-level source. The streamer may include sections that include both hydrophone and particle motion receivers. In one application, some sections have only hydrophones, while other sections have one or more of hydrophones and particle motion receivers. Thus, the streamer may have single component sections and multicomponent sections. The multicomponent sections may be located closer to the towing vessel than the single component sections. Single and multicomponent sections may be mixed. In one embodiment, one or more of the passes noted through the various embodiments may be performed in a different seismic survey. For example, a first seismic survey may acquire NAZ data while a second seismic survey, later in time, may acquire the WAZ data or the WAZ and NAZ data. In other words, reservoir monitoring operations may employ the techniques discussed above. In one example, a 4-dimensional (4D) seismic survey may take advantage of the seismic configurations noted above. A 4D seismic survey includes at least a base survey and a monitor survey performed with time delay, for example, months or years. The base survey can acquire only NAZ data and the monitor survey may acquire WAZ data. The data sets may be combined as discussed above.

The disclosed embodiments provide a method for an acquisition pattern for collecting seismic data. It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the invention. However, one skilled in the art would understand that various embodiments may be practiced without such specific details.

Although the features and elements of the present embodiments are described in particular combinations, each feature or element can be used alone without the other features and elements of the embodiments or in various combinations with or without other features and elements disclosed herein. The methods or flow charts provided in the present application may be implemented in a computer program, software or firmware tangibly embodied in a computer-readable storage medium for execution by a general purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for acquiring seismic data over a survey area, the method comprising:
   deploying streamer and source vessels to acquire seismic data along a survey line;
   performing one pass with the streamer and source vessels, wherein the streamer vessel moves along the survey line, for collecting wide azimuth (WAZ) data; and
   performing another pass with the streamer and source vessels, wherein the streamer vessel moves again along the survey line, in a same direction as during the one pass, for collecting narrow azimuth (NAZ) data,
   wherein the one pass and the another pass are performed during a same seismic survey, and
   wherein a source vessel of the streamer and source vessels moves in parallel to the streamer vessel so that the source vessel is on one side of the streamer vessel during the one pass and the source vessel is on an opposite side of the streamer vessel during the another pass.

2. The method of claim 1, wherein the streamer vessel collects, during the another pass, WAZ data and NAZ data.

3. The method of claim 1, wherein the streamer vessel collects, during the one pass, only WAZ data.

4. The method of claim 1, further comprising:
   performing still another pass with the streamer and source vessels, wherein the streamer vessel moves along the survey line, for collecting different WAZ data.

5. The method of claim 1, wherein there are at least two source vessels.

6. The method of claim 5, wherein the streamer vessel substantially follows the survey line during each pass while the source vessels follow different source lines during each pass.

7. The method of claim 5, wherein the source vessels are ahead of the streamer vessel during one pass.

8. The method of claim 5, wherein the source vessels are on the same side of the streamer vessel.

9. The method of claim 5, wherein at least one source vessel is behind a streamer spread towed by the streamer vessel.

10. The method of claim 1, further comprising:
repeating the passes for another survey line, in a direction opposite to the survey line,
wherein a cross-line offset between the survey line and the another survey line is about half a width of a streamer spread towed by the streamer vessel.

11. The method of claim 1, further comprising:
repeating the passes for another survey line, perpendicular to the survey line.

12. The method of claim 1, wherein the WAZ data includes shooting a source that follows a source line that is different from the survey line, and the NAZ data includes shooting the source that follows a source line that coincide with the survey line.

13. The method of claim 1, wherein the streamer vessel tows plural streamers having a variable-depth profile and/or having multicomponent sections.

14. The method of claim 1, wherein seismic sources towed by source vessels are simultaneously shot.

15. The method of claim 1, wherein the one and another passes are performed during the same seismic survey.

16. The method of claim 1, wherein the source vessels are staggered relative to the streamer vessel along the survey line.

17. A method for acquiring seismic data, the method comprising:
deploying streamer and source vessels to acquire seismic data along a survey line;
performing one pass with the streamer and source vessels, wherein the streamer vessel moves along the survey line, for collecting wide azimuth (WAZ) data; and
performing another pass, during the same seismic survey, with the streamer and source vessels, wherein the streamer vessel moves again along the survey line, in a same direction as during the one pass, for simultaneously collecting narrow azimuth (NAZ) data and WAZ data,
wherein a source vessel of the streamer and source vessels moves in parallel to the streamer vessel so that the source vessel is on one side of the streamer vessel during the one pass and the source vessel is on an opposite side of the streamer vessel during the another pass.

18. A marine seismic acquisition system for collecting seismic data, the system comprising:
a streamer vessel configured to tow a streamer spread along a survey line;
at least one source vessel configured to tow a source along a first source line, substantially parallel to the survey line, for generating wide azimuth (WAZ) data; and
a controller configured to direct, in one pass, the streamer vessel along the survey line and the source vessel along the first source line for collecting the WAZ data, and
to direct, in another pass, the streamer vessel along the survey line in the same direction and the source vessel along a second source line for collecting different WAZ data and narrow azimuth (NAZ) data,
wherein the source vessel moves in parallel to the streamer vessel so that the source vessel is on one side of the streamer vessel during the one pass and the source vessel is on an opposite side of the streamer vessel during the another pass.

19. The system of claim 18, further comprising:
another source vessel that follows a third source line during the one pass and a fourth source line during the another pass.

20. The system of claim 18, wherein the survey line is between the first source line and the second source line.

* * * * *